US010466984B2

(12) United States Patent
Pirmoradi et al.

(10) Patent No.: US 10,466,984 B2
(45) Date of Patent: Nov. 5, 2019

(54) IDENTIFYING AND ASSOCIATING COMPUTER ASSETS IMPACTED BY POTENTIAL CHANGE TO A PARTICULAR COMPUTER ASSET

(71) Applicant: AT&T Intellectual Property I, L.P., Atlanta, GA (US)

(72) Inventors: Shahram Pirmoradi, Sachse, TX (US); Eric Bearden, Forney, TX (US); John Hertzler, San Clemente, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 35 days.

(21) Appl. No.: 15/583,843

(22) Filed: May 1, 2017

(65) Prior Publication Data
US 2018/0314503 A1  Nov. 1, 2018

(51) Int. Cl.
*G06F 8/41* (2018.01)
*G06F 8/71* (2018.01)
(Continued)

(52) U.S. Cl.
CPC .............. *G06F 8/433* (2013.01); *G06F 8/65* (2013.01); *G06F 8/70* (2013.01); *G06F 8/71* (2013.01); *G06F 8/73* (2013.01); *G06Q 10/06* (2013.01)

(58) Field of Classification Search
CPC .............. G06F 8/433; G06F 8/71; G06F 8/73
(Continued)

(56) References Cited

U.S. PATENT DOCUMENTS 6,360,331 B2    3/2002   Vert et al.
6,453,426 B1    9/2002   Gamache et al.
(Continued)

FOREIGN PATENT DOCUMENTS

AU   5751301 A      11/2001
WO   2010034608 A1   4/2010

OTHER PUBLICATIONS

IBM Knowledge Center, "Intelligent Management: static clusters versus dynamic clusters," Version WebSphere Application Server for z/OS 8.5.5x, https://www.ibm.com/support/knowledgecenter/SS7K4U_8.5.5/com.ibmwebsphere.zseriesdoc/ae/rwve_ordcompareclusters.html., Dec. 19, 2016, 4 pages.
(Continued)

*Primary Examiner* — Duy Khuong T Nguyen
*Assistant Examiner* — Theodore E Hebert
(74) *Attorney, Agent, or Firm* — Baker Botts, LLP

(57) ABSTRACT

In one embodiment, in response to a request to determine a computer asset from a plurality of computer assets that would be impacted by a potential change to a particular computer asset of the plurality of computer assets, a processor searches one or more databases for characteristics of each of the plurality of computer assets. The processor identifies an impacted computer asset from the plurality of computer assets. Identifying the impacted computer asset includes determining, by the processor and based on the characteristics of the impacted computer asset and the particular computer asset, that the impacted computer asset depends on the particular computer asset for operation. The processor generates an association from the plurality of computer assets, wherein the association comprises the particular computer asset and the impacted computer asset.

16 Claims, 6 Drawing Sheets

(51) Int. Cl.
*G06F 8/73* (2018.01)
*G06F 8/65* (2018.01)
*G06F 8/70* (2018.01)
*G06Q 10/06* (2012.01)

(58) Field of Classification Search
USPC .......................................................... 717/121
See application file for complete search history.

(56) References Cited

U.S. PATENT DOCUMENTS

| | | | |
|---|---|---|---|
| 6,732,166 | B1* | 5/2004 | Woodruff ............ H04L 67/1097 709/221 |
| 6,952,688 | B1 | 10/2005 | Goldman et al. |
| 7,103,664 | B1 | 9/2006 | Novaes et al. |
| 7,139,925 | B2 | 11/2006 | Dinker et al. |
| 7,406,473 | B1* | 7/2008 | Brassow ............ G06F 17/30067 |
| 7,499,986 | B2 | 3/2009 | Axberg et al. |
| 7,519,908 | B2 | 4/2009 | Quang et al. |
| 7,996,510 | B2 | 8/2011 | Vicente |
| 8,225,313 | B2* | 7/2012 | Esfahany ............ G06F 9/5077 718/1 |
| 8,554,980 | B2 | 10/2013 | Bose |
| 8,725,998 | B1 | 5/2014 | Gabrielson |
| 8,762,642 | B2 | 6/2014 | Bates et al. |
| 8,775,589 | B2 | 7/2014 | Liss et al. |
| 8,838,658 | B2 | 9/2014 | Moore et al. |
| 9,122,559 | B2* | 9/2015 | Mourra ..................... G06F 8/65 |
| 9,225,596 | B2 | 12/2015 | Dunn et al. |
| 9,411,571 | B2* | 8/2016 | Gupta ....................... G06F 8/61 |
| 9,419,856 | B1* | 8/2016 | Chawla ............... H04L 41/0866 |
| 9,444,685 | B2* | 9/2016 | Mishra ................ H04L 41/0853 |
| 9,547,516 | B2* | 1/2017 | Thakkar .............. G06F 9/45558 |
| 2005/0268238 | A1* | 12/2005 | Quang ................... G06F 9/5061 715/734 |
| 2008/0195509 | A1* | 8/2008 | Bellacicco .............. G06Q 10/06 705/28 |
| 2012/0271927 | A1* | 10/2012 | Shakirzyanov ....... G06F 9/5061 709/220 |
| 2013/0283258 | A1* | 10/2013 | Dube ........................ G06F 8/61 717/174 |
| 2014/0245290 | A1* | 8/2014 | Gupta ....................... G06F 8/61 717/178 |
| 2014/0258479 | A1 | 9/2014 | Tenginakai et al. |
| 2015/0333957 | A1 | 11/2015 | James et al. |
| 2016/0014073 | A1* | 1/2016 | Reddy ..................... H04L 67/38 713/2 |
| 2016/0080204 | A1* | 3/2016 | Mishra ................ H04L 41/0853 709/220 |
| 2016/0170773 | A1 | 6/2016 | Franck et al. |
| 2016/0335312 | A1* | 11/2016 | Martin .............. G06F 17/30893 |
| 2017/0060570 | A1* | 3/2017 | Miller ....................... G06F 8/65 |
| 2017/0083310 | A1* | 3/2017 | Barry ....................... G06F 8/71 |
| 2017/0195731 | A1* | 7/2017 | Girlando ............. H04N 21/4668 |
| 2017/0206034 | A1* | 7/2017 | Fetik ..................... G06F 3/0653 |

OTHER PUBLICATIONS

Openwall Community Wiki, "Pre- and post-reboot actions/checklist for remote Linux servers," http://openwall.info/wiki/internal/reboot, Jul. 23, 2010, 2 pages.

Norfolk, D., "The Missing ITIL Manual you always wanted," http://www.bloorresearch.com/blog/the-norfolk-punt/missing-itil-manual-wanted/, Mar. 29, 2012, 4 pages.

Bouchenak, S. et al., "Architecture-Based Autonomous Repair Management Application to J2EE Clusters," Reliable Distributed Systems, Oct. 26-28, 2005, 2 pages.

McNett, M. et al., "Usher: An Extensible Framework for Managing Clusters of Virtual Machines," LISA vol. 7, 2007, pp. 167-181.

* cited by examiner

| + | ASSET | CR | OS | VERSION | PATCH | PATCH DATE | TYPE |
|---|---|---|---|---|---|---|---|
| | ASSET: ASSET 130p | | | | | | |
| ☐ | (+) ASSET 130p | X | SUNSOLARIS | 5.10 | 150400-27 | 28-JAN-16 | VFRAME |

FIG. 4

| ASSET ASSET 130p | | | | | 530 — NEXT ▲ | |
|---|---|---|---|---|---|---|
| + ASSET | CR | OS | VERSION | PATCH | PATCH DATE | TYPE |
| ☒ (-) ASSET 130p | | SUNSOLARIS | 5.10 | 150400-27 | 28-JAN-16 | VFRAME |
| ☒ (R) ASSET 130q | | SUNSOLARIS | 5.10 | 150400-27 | 04-FEB-16 | VFRAME |
| OPTIONAL ASSETS | | | | | | |
| + ASSET | CR | OS | VERSION | PATCH | PATCH DATE | TYPE |
| ☒ (-) ASSET 130q | | SUNSOLARIS | 5.10 | 150400-27 | 4-FEB-16 | VFRAME |
| ☒ (R) ASSET 130p | | SUNSOLARIS | 5.10 | 150400-27 | 28-JAN-16 | VFRAME |
| ☒ (-) ASSET 130r | | SUNSOLARIS | 5.10 | 150400-27 | 02-DEC-15 | VFRAME |
| ☒ (R) ASSET 130s | | SUNSOLARIS | 5.10 | 150400-27 | 02-DEC-15 | FULLZONE |
| ☒ (-) ASSET 130t | | SUNSOLARIS | 5.10 | 150400-30 | 15-FEB-16 | VFRAME |
| ☒ (R) ASSET 130u | | SUNSOLARIS | 5.10 | 150400-30 | 15-FEB-16 | FULLZONE |

*FIG 5*

IDENTIFYING AND ASSOCIATING COMPUTER ASSETS IMPACTED BY POTENTIAL CHANGE TO A PARTICULAR COMPUTER ASSET

BACKGROUND

Business enterprises and other entities often employ an information technology (IT) infrastructure, and frequently a large IT infrastructure. This IT infrastructure may include a suitable combination of hardware, firmware, and software. This IT infrastructure may be used to provide various operations internal to the business, such as to allow employees of the business to perform their jobs. Additionally or alternatively, this IT infrastructure may be used to provide operations external to the business enterprise, such as to provide various functionality or services to customers of the business. In certain situations, the business may desire to make one or more changes to the IT infrastructure, such as to add, replace, or otherwise modify the hardware, firmware, and/or software.

SUMMARY OF PARTICULAR EMBODIMENTS

According to embodiments of the present disclosure, computer assets that would be impacted by a potential change to a particular computer asset are identified and associated.

In one embodiment, a processor searches, in response to a request to determine a computer asset from a plurality of computer assets that would be impacted by a potential change to a particular computer asset of the plurality of computer assets, one or more databases for characteristics of each of the plurality of computer assets. The processor identifies an impacted computer asset from the plurality of computer assets. Identifying the impacted computer asset includes determining, by the processor and based on the characteristics of the impacted computer asset and the particular computer asset, that the impacted computer asset depends on the particular computer asset for operation. The processor then generates an association from the plurality of computer assets, the association including the particular computer asset and the impacted computer asset.

Other aspects of the present disclosure will be readily apparent to one skilled in the art from the following figures, descriptions, and claims.

BRIEF DESCRIPTION OF THE DRAWINGS

To assist in understanding the present disclosure, reference is now made to the following description taken in conjunction with the accompanying drawings, in which:

FIG. 4 illustrates an example of a GUI that may be displayed by the system of FIG. 1, according to certain embodiments;

FIG. 5 illustrates an example of a GUI that may be displayed by the system of FIG. 1, according to certain embodiments.

DESCRIPTION OF EXAMPLE EMBODIMENTS

A business enterprise or other entity, generally referred to throughout this description as an entity, may desire to change or otherwise adjust one or more of its assets within its IT infrastructure. For example, an enterprise may temporarily take a particular computer asset, such as a server, off-line for repairs or improvements. This temporary downtime of the particular computer asset may affect other computer assets within the IT infrastructure. As just one example, taking one computer asset off-line may cause other computer assets to be inoperable. As another example, modifying a particular computer asset may necessitate modifying other computer assets or at least suggest that other computer assets should be modified.

An entity may utilize a system to identify and associate computer assets affected by changes to the particular computer asset. This system may simplify the collection and research of data across multiple databases (e.g., inventory systems) of the entity through integration and automation processes. For example, the system may capture data from the different databases and pull this data together into an intelligent view. In certain embodiments, the system builds and shows key relationships between this data to assist users in creating change requests for production changes to computer assets within the entity. In certain embodiments, the system makes informed decisions, such as automatically grouping certain computer assets together, to remove the complexity of creating change requests. For example, when analyzing a particular computer asset that has been assigned a change request with a scheduled maintenance date that the particular computer asset will be shut down for maintenance, the system may determine that the particular computer asset is a host server and may include its associated virtual servers with its change request for maintenance to reduce or eliminate the likelihood of creating a major power outage.

Identifying and associating computer assets affected by potential changes to a particular computer asset may improve the operational efficiency of an entity and its associated computer systems. As an example, associating multiple computer assets with a single change request may reduce the number of change requests processed by the entity, which may save the entity time and money and reduce the processing burden on computer systems of the entity. As another example, associating one or more computer assets with a particular computer asset may reduce the likelihood of or prevent an unexpected outage of the one or more computer assets, which may minimize the downtime of computer assets associated with the entity to implement one or more changes to computer assets of the entity. As still another example, automatically associating computer assets may reduce the time taken by an administrator of the entity to search for, select, and associate computer assets for change requests.

Figure 1:
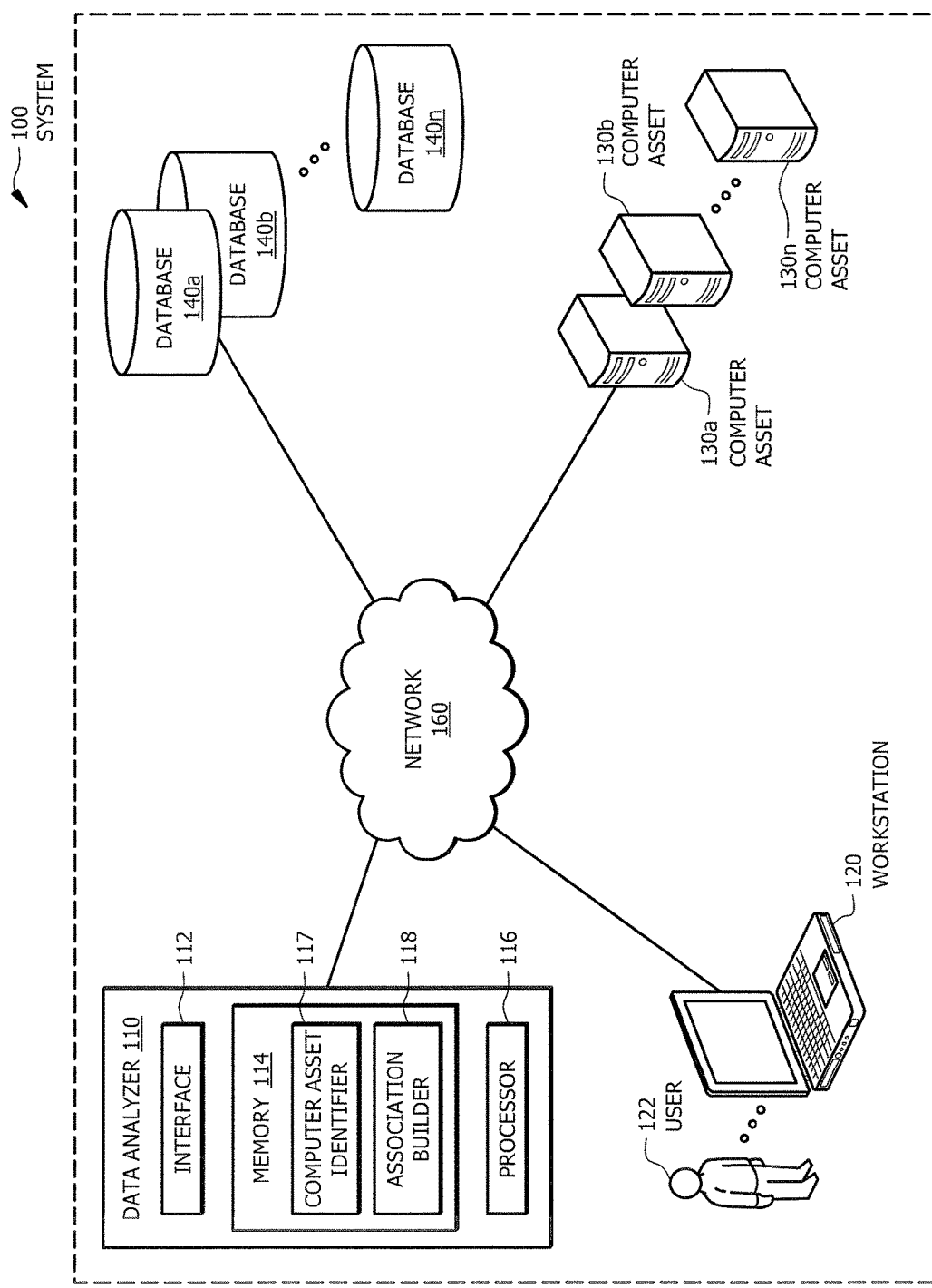
FIG. 1 illustrates a system for identifying and associating computer assets impacted by potential change to a particular computer asset, according to certain embodiments.

FIG. 1 illustrates a system 100 for identifying and associating computer assets impacted by potential change to a particular computer asset, according to certain embodiments. As illustrated in FIG. 1, system 100 includes a data analyzer 110, a workstation 120, one or more computer assets 130, and one or more databases 140. In general, system 100 facilitates identifying computer assets 130, through analysis by data analyzer 110 of information stored in databases 140, that may be impacted by a potential change to a particular computer asset 130a that may be identified to data analyzer 110 via workstation 120.

System 100 or portions thereof may be associated with an entity, which may include any entity, such as a business or company, that manages production changes to computer asset(s) 130. Throughout this description, this entity is referred to as the entity associated with system 100. In one embodiment, data analyzer 110, workstation 120, computer asset(s) 130, and database(s) 140 of system 100 may be included within an entity and connected by a network 160. The elements of system 100 may be implemented using any suitable combination of hardware, firmware, and software.

In the illustrated embodiment, data analyzer 110 is a computer program for analyzing data (e.g., data stored in databases 140) to identify computer assets 130 that may be impacted by or otherwise associated with a potential change to particular computer asset 130a. In the illustrated embodiment, data analyzer 110 includes an interface 112, a memory 114, a processor 116, a computer asset identifier 117, and an association builder 118. The elements of data analyzer 110 may be implemented using any suitable combination of hardware, firmware, and software.

Data analyzer 110 may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more servers, a server pool, switch, router, one or more processors within these or other devices, or any other suitable processing device. Data analyzer 110 may be a stand-alone computer or may be a part of a larger network of computers associated with an entity.

Interface 112 of data analyzer 110 represents any suitable computer element that can receive information from network 160, transmit information through network 160, perform suitable processing of the information, communicate to other components (e.g., workstation 120) of system 100, or any combination of the preceding. For example, interface 112 may receive a communication from workstation 120, transmit information pertaining to the received communication to database(s) 140, receive responses from database(s) 140, and/or communicate a response to the communication to workstation 120. Interface 112 represents any port or connection, real or virtual, including any suitable combination of hardware, firmware, and software, including protocol conversion and data processing capabilities, to communicate through a Local Area Network ("LAN"), Wide Area Network ("WAN"), or other communication system that allows the entity associated with system 100 to exchange information between components of system 100.

Memory 114 of data analyzer 110 stores, permanently and/or temporarily, received and transmitted information, as well as system software, control software, and other software for data analyzer 110, and a variety of other information. Memory 114 may store information for execution by processor 116. In the illustrated embodiment, memory 114 stores the following applications of data analyzer 110: computer asset identifier 117 and association builder 118. Memory 114 of data analyzer 110 may store certain characteristics of computer asset(s) 130. The characteristics of each computer asset 130 may include any features that describe aspects of the individual computer asset 130. For example, characteristics of particular computer asset 130a may include a name of computer asset 130a, a change request number assigned to computer asset 130a, the operating system for computer asset 130a, a version of that operating system, and a patch date indicating when computer asset 130a is scheduled for maintenance. A change request number indicates that particular computer asset 130 has been scheduled for maintenance (e.g., a change to computer asset 130a's operating system, patching, firmware updates, etc.)

Memory 114 includes any one or a combination of volatile or non-volatile local or remote devices suitable for storing information. For example, memory 114 may include Random Access Memory ("RAM"), Read-only Memory ("ROM"), magnetic storage devices, optical storage devices, or any other suitable information storage device or a combination of these devices. Memory 114 may include any suitable information for use in the operation of data analyzer 110. Additionally, memory 114 may be a component external to (or may be partially external to) data analyzer 110. Memory 114 may be located at any location suitable for memory 114 to communicate with data analyzer 110.

Processor 116 of data analyzer 110 controls the operation of data analyzer 110 by processing information received from interface 112 and memory 114 or otherwise accessed by processor 116. Processor 116 communicatively couples to interface 112 and memory 114. Processor 116 includes any hardware and/or software that operates to control and process information. For example, processor 116 controls the operation of computer asset identifier 117 and association builder 118. Processor 116 may be a programmable logic device, a microcontroller, a microprocessor, any suitable processing device, or any suitable combination of the preceding. Additionally, processor 116 may be a component external to data analyzer 110. Processor 116 may be located in any location suitable for processor 116 to communicate with data analyzer 110. Processor 116 performs operations of data analyzer 110 such as analyzing data across database(s) 140.

Computer asset identifier 117 accesses information in database(s) 140, processes and analyzes the accessed information, and arranges this information into an organized view. For example, computer asset identifier 117 may search database(s) 140 for particular computer asset 130a of computer assets 130, determine which information (e.g., characteristics) to collect for particular computer asset 130a, and arrange this collected information into an intelligent view so that interface 112 call display this collected information to a user 122.

Particular computer asset 130a may be a computer asset 130 for which a potential change is planned. For example, user 122 of workstation 120 may identify to data analyzer 110 particular computer asset 130a for which a potential change is planned. A change to particular computer asset 130a may include performing any suitable type of modification related to particular computer asset 130a, such as modifying, replacing, or removing elements of particular computer asset 130a and/or modifying (e.g., updating), replacing, or removing computer asset 130a as a whole. For example, a change to particular computer asset 130a may include any suitable combination of modifying, replacing, or removing hardware of particular computer asset 130a; modifying, replacing, or removing firmware of particular computer asset 130a; modifying, replacing, or removing software of particular computer asset 130a; and modifying, replacing, or removing particular computer asset 130a as a whole. As a particular example, software of particular computer asset 130a may be patched to fix a bug or improve the performance of particular computer asset 130a.

Data analyzer 110 (e.g., computer asset identifier 117) may receive an identification of particular computer asset 130a (e.g., input via workstation 120) and perform associated operations based on the identification of this particular computer asset 130a. For example, interface 112 of data analyzer 110 may present user 122 of workstation 120 with a search entry box (e.g., multi-selection list box 310 of FIG. 3) via network 160 and receive a name of particular computer asset 130a from workstation 120 via network 160. Although identification of particular computer asset 130a is described as being performed in a particular manner, the present disclosure contemplates data analyzer 110 (e.g., computer asset identifier 117) becoming aware of the identity of particular computer asset 130a in any suitable manner.

Computer asset identifier 117 may search database(s) 140 for information (e.g., characteristics) of computer asset(s) 130 to determine whether computer assets 130 include one or more impacted computer assets. An impacted computer asset may include a computer asset that could be impacted by a potential change to particular computer asset 130a. In certain embodiments, the determination of whether computer assets 130 include one or more impacted computer assets includes determining that operation of the impacted computer asset will shut down when the potential change to particular computer asset 130a is implemented. For example, particular computer asset 130a may be taken off-line, either temporarily or permanently, such that computer asset(s) 130 hosted by particular computer asset 130a will likewise be taken off-line.

In certain embodiments, the determination of whether computer assets 130 include one or more impacted computer assets includes searching database(s) 140 for computer asset(s) 130 that share certain relationships, based on the characteristics of computer assets 130, with particular computer asset 130a. Computer asset identifier 117 may identify a characteristic of particular computer asset 130a and search database(s) 140 for characteristics related to the identified characteristic of particular computer asset 130a. For example computer asset identifier 117 may determine, based on the characteristics of particular computer asset 130a and other assets 130, that one or more other computer assets 130 are dependent on particular computer asset 130a such that implementing a change on particular computer asset 130a may impact operation on the one or more other computer assets 130. As a particular example, computer asset identifier 117 may determine, from a characteristic of particular computer asset 130a, that particular computer asset 130a is a parent server. Computer asset identifier 117 may search database(s) 140 and determine, from one or more characteristics of computer asset(s) 130, that one or more computer asset(s) 130 are virtual servers hosted by particular computer asset 130a. Based on this determination, computer asset identifier 117 may categorize these virtual servers as impacted computer assets.

Computer asset identifier 117 may search database(s) 140 for information (e.g., characteristics) of computer asset(s) 130 to determine whether computer assets 130 include one or more optional computer assets. In certain embodiments, an optional computer asset shares identical or similar applications with particular computer asset 130a. As an example, particular computer asset 130a and optional computer asset may share an identical web application, such as a web application for instant messaging services. Parameters for identifying what constitutes an optional computer asset may be determined by the designer of system 100, according to the design parameters appropriate for the entity associated with system 100 for example. For example, the entity associated with system 100 may request that certain types of computer assets 130 and/or computer assets 130 having certain characteristics in common with particular computer asset 130a be identified as optional computer assets 130, and the designer of system 100 may implement appropriate parameters for identifying optional computer assets 130 to meet that request.

In certain embodiments, the determination of whether computer assets 130 include one or more optional computer assets may include searching database(s) 140 for computer asset(s) 130 that share characteristics with particular computer asset 130a. Computer asset identifier 117 may identify a characteristic of particular computer asset 130a and search database(s) 140 for identical or similar characteristics related to the identified characteristic of particular computer asset 130a. For example, computer asset identifier 117 may determine, from a characteristic of particular computer asset 130a, that particular computer asset 130a has a particular web application. Computer asset identifier 117 may search database(s) 140 and determine, from one or more characteristics of computer asset(s) 130, that one or more computer asset(s) 130 have the exact or similar web application as the particular web application of particular computer asset 130a. Based on this determination, computer asset identifier 117 may categorize these one or more computer asset(s) with exact or similar web applications as optional computer assets.

Computer asset identifier 117 may differentiate between particular computer asset 130a and one or more other computer assets having exact applications and particular computer asset 130a and one or more other computer assets having similar (e.g., partial) applications. For example, computer asset identifier 117 may determine, by searching database(s) 140 (e.g., a database that stores information about an enterprise's databases and servers,) that the applications of particular computer asset 130a exactly match the applications of a first computer asset. Computer asset identifier 117 may also determine, by searching database(s) 140, that the applications of particular computer asset 130a partially match (e.g., share a first application but not a second application) the applications of a second computer asset. Based on these determinations of the computer assets sharing exact or similar applications, computer asset identifier 117 may categorize the first and second computer assets as optional computer assets.

In certain embodiments, data analyzer 110 displays search results to user 122 of workstation 120 via interface 112. For example, computer asset identifier 117 of data analyzer 110 may display one or more characteristics of each determined impacted computer asset, including an identification of each determined impacted computer asset. As another example, computer asset identifier 117 may display one or more characteristics of each determined optional computer asset, including an identity of each determined optional computer asset. The search results may be displayed to user 122 of workstation 120 via a GUI. In certain embodiments, the GUI allows user 122 of workstation 120 to interact with the displayed search results. For example, the GUI may allow user 122 to select one or more computer assets 130 for association with particular computer asset 130a. Examples of GUIs that may be displayed by system 100 are described below in FIGS. 3-5.

Association builder 118 builds associations between particular computer asset 130a and other computer assets 130, such as some or all of the impacted computer assets 130 and optional computer assets 130. For example, association builder 118 may automatically build an association between particular computer asset 130a and an impacted computer asset identified by computer asset identifier 117 by grouping particular computer asset 130a with the impacted computer asset such that particular computer asset 130a and impacted computer asset share the same change request. As another example, association builder 118 may build an association between particular computer asset 130a and one or more optional computer assets identified by computer asset identifier 117 by grouping particular computer asset 130a with the optional computer assets that have been selected for grouping such that particular computer asset 130a and the optional computer assets share the same change request. As still another example, association builder 118 may group particular computer asset 130a, the impacted computer asset, and the optional computer assets into one list such that the particular computer asset 130a, the impacted computer asset, and the optional computer assets all share the same change request. Grouping multiple computer assets 130 into a single change request may reduce the number of change requests to be implemented by the entity associated with system 100.

Computer asset identifier 117 and association builder 118 may be implemented using any suitable combination of hardware, firmware, and software. In certain embodiments, computer asset identifier 117 and association builder 118 are logic, implemented as a computer program, that may be executed by processor 116, and in response to that execution perform their associated operations.

Workstation 120 of system 100 may be any computing device that provides a mechanism to view and interact with information received from one or more components (e.g., data analyzer 110) of system 100. In certain embodiments, workstation 120 includes a GUI that can display information. Workstation 120 may be located on the physical premises of the entity associated with system 100 (e.g., one or more buildings at one or more geographical locations of the entity). In some embodiments, workstation 120 is located outside of the physical premises of the entity associated with system 100 (e.g., at a residence of a user 122), wherein user 122 of workstation 120 connects to network 160 of the entity associated with system 100 via a virtual private network (VPN.) User 122 may be any administrator of the entity associated with system 100 (e.g., a system administrator, a database administrator, or an application owner) involved with production changes to computer asset(s) 130. For example, user 122 may be responsible for creating a change request to initiate a production change to computer asset(s) 130. User 122 may use workstation 120 to connect to data analyzer 110 over network 160. In certain embodiments, user 122 of workstation 120 is authorized by the entity associated with system 100 to access data analyzer 110. User 122 may access data analyzer 110 by logging into a home page of data analyzer 110 via workstation 120. In certain embodiments, user 122 may be requested to enter an identification associated with the entity associated with system 100 to access data analyzer 110 via a web portal.

Although this disclosure described particular operations being performed by a user 122 of workstation 120, the present disclosure contemplates any suitable component performing these features. For example, in addition or as an alternative to user 122 of workstation 120 performing these operations, the present disclosure contemplates a software application automatically performing these operations. As a particular example, the software application may automatically determine that implementing a change is appropriate for particular computer asset 130a and send a request to data analyzer 110 to perform operations described in this disclosure.

Computer asset(s) 130 of system 100 may be any computing element capable of undergoing production changes, including any suitable combination of hardware, firmware, and software. Computer asset(s) 130 may be one computer asset in a collection of computer assets 130[a-n]. Each such computer asset (illustrated here as 130[a] ... 130[n]) is one among a total of N, where N is any suitable integer. Each computer asset 130 may be a computer, a server, an application, a networking device, a database, any other type of equipment, or a combination thereof. Servers include physical servers (e.g., a host server) and virtual servers (e.g., a server hosted by the physical server). Virtual servers share hardware and/or software resources with other operating systems (e.g., an operating system of a physical server.)

In certain embodiments, certain computer assets 130 may form a cluster. For example, particular computer asset 130a may include a database with a rack such that particular computer asset 130a splits off between computer assets 130b and 130c. In this example, computer assets 130a, 130b, and 130c form a cluster. In certain embodiments, if one computer asset 130 from a cluster (e.g., computer asset 130a) is taken down for maintenance, the other computer assets in the cluster (e.g., computer assets 130b and 130c) will be affected. For example, rebooting computer asset 130a without disabling computer assets 130b and 130c may cause an outage.

Database(s) 140 of system 100 may be any database(s) that store data. Database(s) 140 may be one database in a collection of databases 140[a-n]. Each such database (illustrated here as 140[a] ... 140[n]) is one among a total of N, where N is any suitable integer. Database(s) 140 include any one or a combination of volatile or non-volatile local or remote devices suitable for storing information. For example, database(s) 140 may include Random Access Memory ("RAM"), Read-only Memory ("ROM"), magnetic storage devices, optical storage devices, or any other suitable information storage device or a combination of these devices. Database(s) 140 may be located in any location suitable for communication with data analyzer 110. Although described as databases, databases 140 may be implemented as any suitable type of volatile or non-volatile memory. Databases 140 may include one or more interfaces and/or processors.

Database(s) 140 may serve as inventory systems for the entity associated with system 100. In certain embodiments, database(s) 140 store, either permanently or temporarily, data pertaining to computer asset(s) 130, such as characteristics of computer assets 130. Each database 140 may store a particular type of information. In certain embodiments, database 140a may be a server inventory system that stores information pertaining to servers of the entity associated with system 100. For example, computer asset 130a may be a server, and database 140a may store characteristics of computer asset 130a such as a name of computer asset 130a, subsidiary information, a vendor name, an operating system and its associated release version and time zone, a serial number, a model number, and a patch date of computer asset 130a. In certain embodiments, database 140b may be an inventory system of databases of the entity associated with system 100. For example, computer asset 130b may be a database, and database 140b may store characteristics of computer asset 130b including but not limited to an approval group identifier, an approver identifier, an approval status, a planned start and end date for a change request, and a summary of the change request. In certain embodiments, database 140c may be an application inventory system that houses information about applications of the entity associated with system 100. For example, computer asset 130c may be an application, and database 140c may store characteristics of computer asset 130c including but not limited to the name of the application, systems related to the application, and specific versions of the application.

Network 160 may include any device or collection of devices that facilitate communication between components of system 100. For example, network 160 may facilitate the transfer of information between data analyzer 110, workstation 120, computer asset(s) 130, and database(s) 140. Network 160 can be implemented using any suitable network or networking technology. For example, one or more portions of network 160 may include an ad hoc network, an intranet, an extranet, a VPN, LAN, a wireless LAN (WLAN), a WAN, a wireless WAN (WWAN), a metropolitan area network (MAN), a portion of the Internet, a portion of the Public Switched Telephone Network (STN), a cellular telephone network, or a combination of two or more of these.

In certain embodiments, network 160 is a private network that isolates users and workgroups external to the entity. As an example, network 160 may only be accessible to users 122 and workgroups on the premises of the entity associated with system 100. As another example, network 160 may be accessible to users 122 via a secure link (e.g., a VPN). The VPN may allow user 122 of workstation 120 to send and receive data as if the user's workstation 120 were directly connected to network 160 while maintaining the security of network 160. In certain embodiments, network 160 facilitates communication between one or more components of system 100 (e.g., computer assets 130 and databases 140) hosted in a cloud environment.

In operation of an example embodiment of system 100, an interface 112 of data analyzer 110 receives an identification of particular computer asset 130a from computer assets 130. In response to receiving the identification of particular computer asset 130a, processor 116 searches one or more databases 140 for characteristics of each computer asset 130. Processor 116 of data analyzer 110 determines, in response to the identification of particular computer asset 130a, whether computer assets 130 include an impacted computer asset. If processor 116 determines that computer assets 130 include an impacted computer asset, processor 116 associates particular computer asset 130a with the impacted computer asset.

Processor 116 of data analyzer 110 further determines, in response to the identification of particular computer asset 130a, whether computer assets 130 include an optional computer asset. If processor 116 determines that computer assets 130 include an optional computer asset, processor 116 determines whether the optional computer asset has been selected to be associated with particular computer asset 130a. If processor 116 determines that optional computer asset has been selected for association, processor 116 associates particular computer asset 130a with the optional computer asset. Processor 117 then builds an association that includes particular computer asset 130a and one or more of the impacted computer asset(s) and the optional computer asset(s).

Modifications, additions, or omissions may be made to system 100. For example, system 100 may include any number of data analyzers 110. Furthermore, the components of system 100 may be integrated or separated. For example, data analyzer 110 and workstation 120 may be incorporated into a single component.

Figure 2:
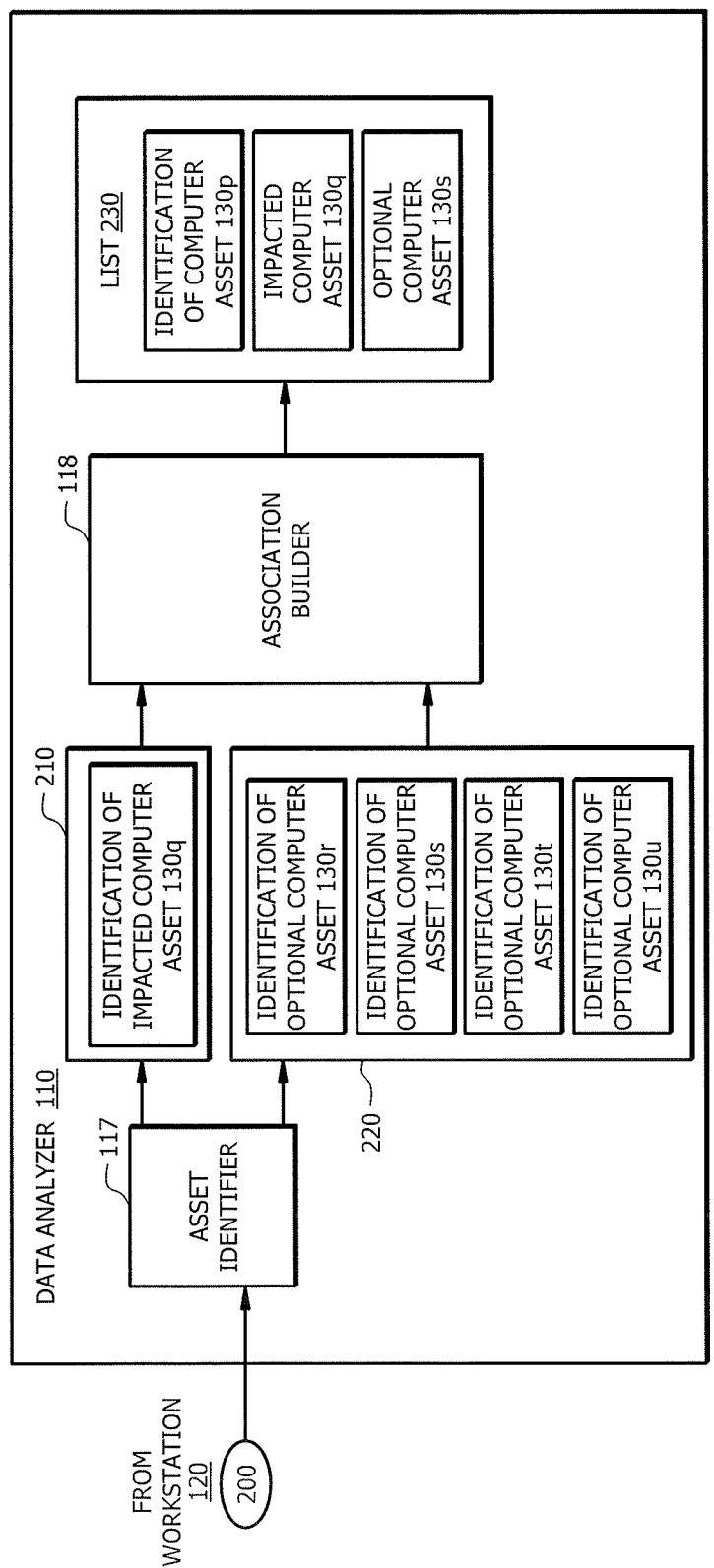
FIG. 2 illustrates a block diagram of additional example details of portions of the system of FIG. 1, according to certain embodiments.

FIG. 2 illustrates a block diagram that may be used by system 100 of FIG. 1, according to certain embodiments. In particular, FIG. 2 illustrates additional example details of data analyzer 110 and workstation 120, according to certain embodiments. As shown in FIG. 2, data analyzer 110 receives an identification 200 of particular computer asset 130p from workstation 120. In response to receiving identification 200 of particular computer asset 130p, computer asset identifier 117 determines that computer assets 130a-n include impacted computer asset 130q and identifies impacted computer asset 130q in search results 210. For example, computer asset identifier 117 may search database(s) 140 for particular computer asset 130p, analyze one or more characteristics of particular computer asset 130p, and determine from analyzing the characteristics of particular computer asset 130p that particular computer asset 130p is a host server. Computer asset identifier 117 may then search database(s) 140 for all computer assets 130 that run on host computer asset 130p and analyze one or more characteristics of computer assets 130. Computer asset identifier 117 may determine, from analyzing the characteristics of computer assets 130a-n, that computer asset 130q is a virtual server that is hosted by computer asset 130p. Based on this determination, computer asset identifier 117 may classify computer asset 130q as an impacted server since it will be impacted by modification (e.g., maintenance) of host computer asset 130p.

In certain embodiments, computer asset identifier 117 determines that computer assets 130 include optional computer assets 130r, 130s, 130t, and 130u in response to receiving identification 200 of particular computer asset 130p and identifies optional computer assets 130r, 130s, 130t, and 130u in search results 220. For example, computer asset identifier 117 may search database(s) 140 for particular computer asset 130p, analyze one or more characteristics of particular computer asset 130p, and determine from analyzing the characteristics of particular computer asset 130p that computer asset 130p includes a particular application. Computer asset identifier 117 may then search database(s) 140 for all computer assets 130 that have identical or similar applications to the particular application of computer asset 130p and determine, by analyzing one or more characteristics of computer assets 130a-n, that computer assets 130r, 130s, 130t, and 130u share identical or similar applications to the particular application of computer asset 130p. Based on this determination, computer asset identifier 117 may classify computer assets 130r, 130s, 130t, and 130u as optional computer assets. User 122 of workstation 120 may choose to group computer assets 130r, 130s, 130t, and 130u with particular computer asset 130p to reduce the number of change requests implemented by the entity associated with system 100.

After computer asset identifier 117 of data analyzer 110 identifies impacted computer asset 130q and optional computer assets 130r-u, association builder 118 of data analyzer 110 groups certain of these computer assets 130 to particular computer asset 130p. In the illustrated embodiment, association builder 118 automatically groups particular computer asset 130p with impacted computer asset 130q, which may reduce or eliminate the possibility of a potential outage to one or more computer assets 130. Association builder 118 groups optional computer assets 130r-u with particular computer asset 130p that are selected for grouping. In the illustrated embodiment, optional computer asset 130s has been selected for grouping. Association builder 118 pairs optional computer asset 130s with particular computer asset 130p and impacted computer asset 130q. Association builder 118 may then generate a list 230 of this group of computer assets 130p, 130q, and 130s. In certain embodiments, list 230 includes one or more characteristics of each computer asset 130p, 130q, and 130s.

Figure 3:
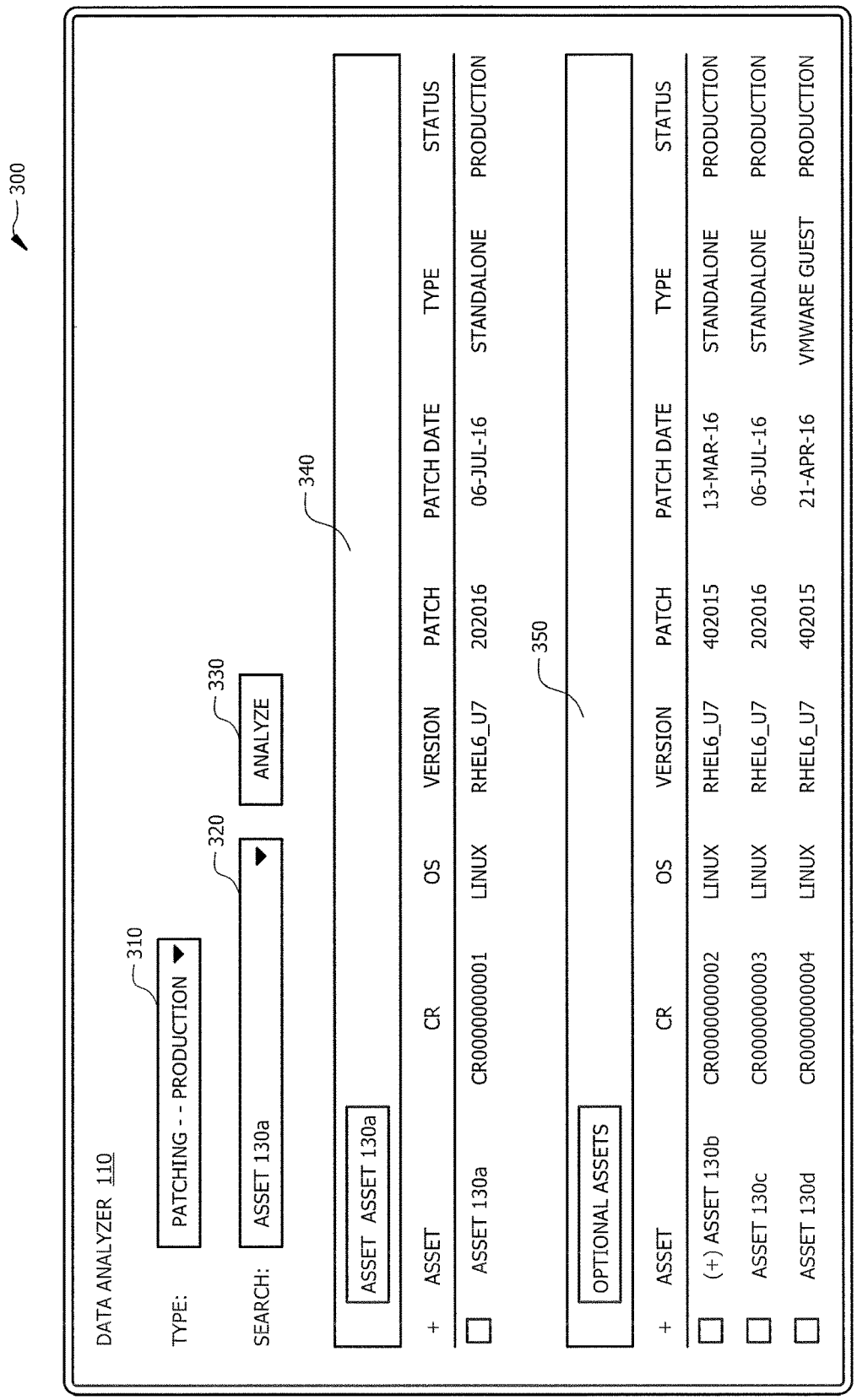
FIG. 3 illustrates an example of a graphical user interface (GUI) that may be displayed by the system of FIG. 1, according to certain embodiments.

FIG. 3 illustrates an example of a graphical user interface (GUI) 300 that may be displayed by system 100 of FIG. 1, according to certain embodiments. For example, data analyzer 110 (e.g., computer asset identifier 117) or another suitable component of system 100 may generate GUI 300 for display on workstation 120. GUI 300 may provide user 122 of workstation 120 with a display showing particular computer asset 130a (e.g., computer asset 130a identified by user 122 of workstation 120 for a potential change), impacted computer assets 130 that are identified by computer asset identifier 117 as being potentially impacted by the change to particular computer asset 130a, and optional computer assets 130 identified by computer asset identifier 117.

GUI 300 provides an interface through which user 122 of workstation 120 can input an identification of particular computer asset 130a and request for data analyzer 110 to identify, based on the identification of particular computer asset 130a, whether computer assets 130 include impacted and/or optional computer assets 130. Data analyzer 110 receives input through GUI 300 and displays the results of the identified impacted and/or optional computer assets 130. GUI 300 also provides an interface through which user 122 of workstation 120 can select which impacted computer assets 130 and/or optional computer assets 130 are to be associated with a request to implement the change to the particular computer asset 130. Details of the particular example GUI 300 shown in FIG. 3 are described below.

GUI 300 includes a multi-selection list box 310 that allows user 122 to select a type of potential change to be implemented on particular computer asset 130a. As shown, the potential change "Patching—Production" is selected from multi-selection list box 310, which instructs data analyzer 110 to search for computer asset(s) 130 that may be grouped (e.g., patched) for production with particular computer asset 130a selected from computer assets 130. GUI 300 also includes a search box 320 that allows user 122 to input an identification of a computer asset 130a. As shown, user 122 has input particular computer asset 130a, as indicated by "ASSET 130a" in search box 320. Particular computer asset 130a identified in search box 320 may be considered particular computer asset 130a selected by user 122 of workstation 120 for implementation of a potential change (e.g., the potential change selected in selection list box 310.)

GUI 300 includes a command button 330 illustrated as "ANALYZE." When command button 330 is selected (e.g., clicked on by user 122 of workstation 120,) data analyzer 110 analyzes data across database(s) 140. As an example, when command button 330 is selected, data analyzer 110 may search database(s) 140 for characteristics of particular computer asset 130a. As another example, when command button 330 is selected, data analyzer 110 may analyze the characteristics of computer asset(s) 130 based on the characteristics of particular computer asset 130a and determine whether computer asset(s) 130 include impacted computer assets and/or optional computer assets 130. As still another example, when command button 330 is selected, data analyzer 110 may group particular computer asset 130a with one or more impacted computer assets and/or optional computer assets. In certain embodiments, data analyzer 110 may display a message indicating to user 122 that data analyzer 110 is performing one or more of these functions (e.g., searching, analyzing, or grouping.) For instance, data analyzer 110 may display the following message via GUI 300: "Grouping your assets. Please wait . . . ."

In the illustrated embodiment, data analyzer 110 displays the results generated from analyzing particular computer asset 130a, which are shown in GUI 300 under column headers 340 and 350. Column header 340 lists characteristics of particular computer asset 130a, which include a name (Asset) of computer asset 130a, a change request number (CR) assigned to computer asset 130a, a type of operating system (OS) for computer asset 130a, a version of the operating system (Version), a patch level (Patch), a patch date (Patch Date), a type of computer asset 130a (Type), and a status (Status) of service for computer asset 130a. Computer asset 130a's name (Asset) is listed as "ASSET 130a," which identifies the computer asset selected for analysis. Change request number (CR) is listed as "CR0000000001," which, in one embodiment, indicates that particular computer asset 130a was assigned a change request number prior to generating the search. At least in some embodiments, because particular computer asset 130a has already been assigned a change request number, data analyzer 110 does not generate a new change request number for particular computer asset 130a. The present disclosure, however, contemplates change request numbers being generated in any suitable manner. The type of operating system (OS) for particular computer asset 130a is listed as LINUX, the version (Version) of the Linux operating system is listed as RHEL6_U7, the patch level (Patch) is listed as "2Q2016," the patch date (Patch Date) is listed as 8 Jul. 2016, the type (Type) of particular computer asset 130a is listed as STANDALONE, and the status (Status) of service for particular computer asset 130a is listed as Production.

In certain embodiments, column headers 340 and 350 may include less or more characteristics of particular computer asset 130a than those shown in FIG. 3. For example, column headers 340 and 350 may include columns for application names APP A and APP B. An "X" may be placed under application name APP A when particular computer asset 130a and/or one or more computer assets (e.g., computer asset 130b) include application APP A. Similarly, an X may be placed under application name APP B when particular computer asset 130a and/or one or more computer assets (e.g., computer asset 130c) include application APP B. In certain embodiments, an X listed under APP A and APP B for particular computer asset 130a and an X listed under APP A and APP B for computer asset 130b indicates an exact application match between particular computer asset 130a and computer asset 130b. In some embodiments, an X listed under APP A and APP B for particular computer asset 130a and an X listed under APP A (but not APP B) for computer asset 130c indicates a partial application match between particular computer asset 130a and computer asset 130c.

Column header 340 also lists characteristics of one or more impacted computer assets in the event data analyzer 110 determines that computer assets 130 include one or more impacted computer assets. In this illustrated embodiment, data analyzer 110 determined that computer assets 130 do not include impacted computer assets 130 other than particular computer asset 130. Therefore, only particular computer asset 130a is listed under column header 340. An example of a GUI displaying an impacted computer asset is described below in FIG. 5.

Column header 350 includes characteristics for one or more optional computer assets. In the illustrated embodiment, data analyzer 110 returned results for optional computer assets 130b-d, which are listed as ASSET 130b, ASSET 130c, and ASSET 130d, respectively. The (+) mark next to ASSET 130b indicates that optional computer asset 130b has additional information to display to user 122. Selecting (e.g., clicking on) the (+) mark displays all computer assets 130a-n that have been determined to be potentially impacted by modification to computer asset 130b. The check boxes next to ASSET 130b, ASSET 130c, and ASSET 130d assist system 100 in receiving an indication to associate one or more optional computer assets 130b-d with particular computer asset 130a. For example, the check boxes allow user 122 to select which computer assets 130b-d to associate with particular computer asset 130a. In the illustrated embodiment, if the check box next to ASSET 130b is selected, computer asset 130b may be grouped with particular computer asset 130a. In certain embodiments, when an optional computer asset (e.g., computer asset 130b) is selected for grouping with particular computer asset 130a, any impacted computer assets 130 associated with the selected optional computer asset may automatically be grouped with particular computer asset 130a as well.

In certain embodiments, data analyzer 110 links to one or more databases 140 external to data analyzer 110. For example, when asset name ASSET 130a under column header 340 is selected (e.g., clicked on,) data analyzer 110 may connect user 122 to database 140a of the entity associated with system 100 such that an interface of data analyzer 110 displays characteristics of computer asset 130a that are not shown in GUI 300. These characteristics may include a host identification of particular computer asset 130a, a vendor name, a time zone of particular computer asset 130a's operating system, a network tier, a serial number of computer asset 130p, a domain name, a global status (e.g., ACTIVE,) and so forth. As another example, when change request number CR0000000001 next to ASSET 130a is selected, data analyzer 110 may connect to a database 140 of the entity associated with system 100 such that an interface of data analyzer 110 displays details of change request CR0000000001. This change request information may include an approval group identifier, an approver identifier (e.g., an administrator identification,) an approval status (e.g., approved,) a planned start and end date for the change request, a summary of the change request, and so forth.

FIG. 4 illustrates an example of a GUI 400 that may be displayed by system 100 of FIG. 1, according to certain embodiments. GUI 400 displays the results of a search for particular computer asset 130p (e.g., particular computer asset 130p input by user 122 of workstation 120 for implementation of a potential change.) Column header 410 is similar to column header 340 of FIG. 3. Particular computer asset 130p is listed as ASSET 130p. The "X" mark under change request heading CR indicates that a change request number has not been assigned to particular computer asset 130p. In this example, the lack absence of a change request number indicates that particular computer asset 130p has not been scheduled for patching. In certain embodiments, data analyzer 110 assigns particular computer asset 130p a change request number. For example, data analyzer 110 may assign particular computer asset 130p a new change request number. As another example, data analyzer 110 may group particular computer asset 130p with another computer asset 130 that has already been assigned a change request number. The (+) mark next to asset name ASSET 130p indicates that particular computer asset 130p includes one or more impacted assets. Selecting the check box next to ASSET 130p displays the one or more impacted assets, as shown in FIG. 5.

FIG. 5 illustrates an example of a GUI 500 that may be displayed by system 100 of FIG. 1, according to certain embodiments. Data analyzer 110 displays results from analyzing particular computer asset 130p (e.g., particular computer asset 130p input by user 122 of workstation 120 for implementation of a potential change), which are shown in GUI 500 under column headers 510 and 520. Column header 510 is similar to column header 410 of FIG. 4. Under Asset of column header 510, searched particular computer asset 130p is listed as ASSET 130p. Additionally, data analyzer 110 lists computer asset 130q as ASSET 130q, which indicates that computer asset 130q is an impacted computer asset that must be grouped with particular computer asset 130p. The (R) notation next to ASSET 130q indicates that computer asset 130q is related to computer asset 130p. In certain embodiments, a related computer asset, as illustrated in FIG. 5, is either hosted by the searched particular computer asset (e.g., computer asset 130q is hosted by particular computer asset 130p) or shares the same parent computer asset with the searched particular computer asset (e.g., computer asset 130s shares the same parent computer asset with computer asset 130p.)

Additionally, data analyzer 110 determines that six computer assets 130p-u share the same or similar applications to particular computer asset 130p. These six computer assets are listed under column header 520 as ASSET 130q, ASSET 130p, ASSET 130r, ASSET 130s, ASSET 130t, and ASSET 130u. In the illustrated embodiment, the asset names under column header 520 duplicate the computer assets listed under column header 510, which include impacted computer asset 130q and particular computer asset 130p (i.e., ASSET 130q and ASSET 130p). The (R) notation next to ASSET 130s indicates that computer asset 130s is related to selected computer asset 130p. However, in this example, while computer asset 130s is related to computer asset 130p, computer asset 130s is determined not to be an impacted computer asset such that it is automatically grouped with computer asset 130p. In the illustrated embodiment of FIG. 5, because computer asset 130s is listed under the OPTIONAL ASSETS column heading, computer asset 130s may be grouped with computer asset 130p if the check box next to (R) ASSET 130s is selected (e.g., by user 122 of workstation 120). In other embodiments, one or more optional computer assets 130 may be grouped automatically with computer asset 130p, regardless of that status of the optional computer asset 130 as "optional" and not "impacted."

In certain embodiments, an (F) notation may be displayed next to the identification of a computer asset (e.g., optional computer asset 130q) to indicate that the computer asset is a failover computer asset. A failover computer asset is clustered to computer asset 130p. In some embodiments, a (P) notation may be displayed next to the identification of a computer asset (e.g., optional computer asset 130q) to indicate that the computer asset is a parent computer asset that hosts particular computer asset 130p.

As shown in GUI 500, all six optional computer assets 130p-u listed under column header 520 are selected for grouping since all six check boxes next to the computer asset identifications are checked. GUI 300 includes a button 530 illustrated as "NEXT" that, when selected (e.g., clicked on,) commands data analyzer 110 to display information associated with each of selected computer assets 130p-u. This displayed information may include a column header that lists the name of each computer asset 130p-u and additional information associated with each computer asset 130p-u, such as the names of individuals associated with each computer asset 130p-u and the status of each computer asset 130p-u (e.g., Production.) The column header may include several other interactive headers that, when selected, display additional information regarding computer assets 130p-u and/or connect user 122 to one or more databases 140. As an example, when an application name for computer asset 130p is selected, data analyzer 110 may display details associated with computer asset 130p. As another example, when an administrator's identification is selected, data analyzer 110 may connect user 122 to the administrator's messaging system.

In certain embodiments, data analyzer 110 includes a button that, when selected (e.g., clicked on,) exports information to Excel. As an example, data analyzer 110 may have a button labeled "Export to Excel" that, when selected, exports a list of selected computer assets (e.g., computer assets 130p-u) to Excel. Data analyzer 110 may then prompt user 122 to connect to a different tool to complete scheduling of a change request. For example, data analyzer may display an interactive button that, when selected, links user 122 to a visual planning tool. As another example, data analyzer 110 may display an interactive button that, when selected, links user 122 to a tool that allows user 122 to complete the change request.

FIGS. 3-5 illustrate just one set of example of GUIs that may be generated by system 100. This disclosure contemplates system 100 generating any suitable GUIs including any suitable information, according to particular implementations.

Figure 6:
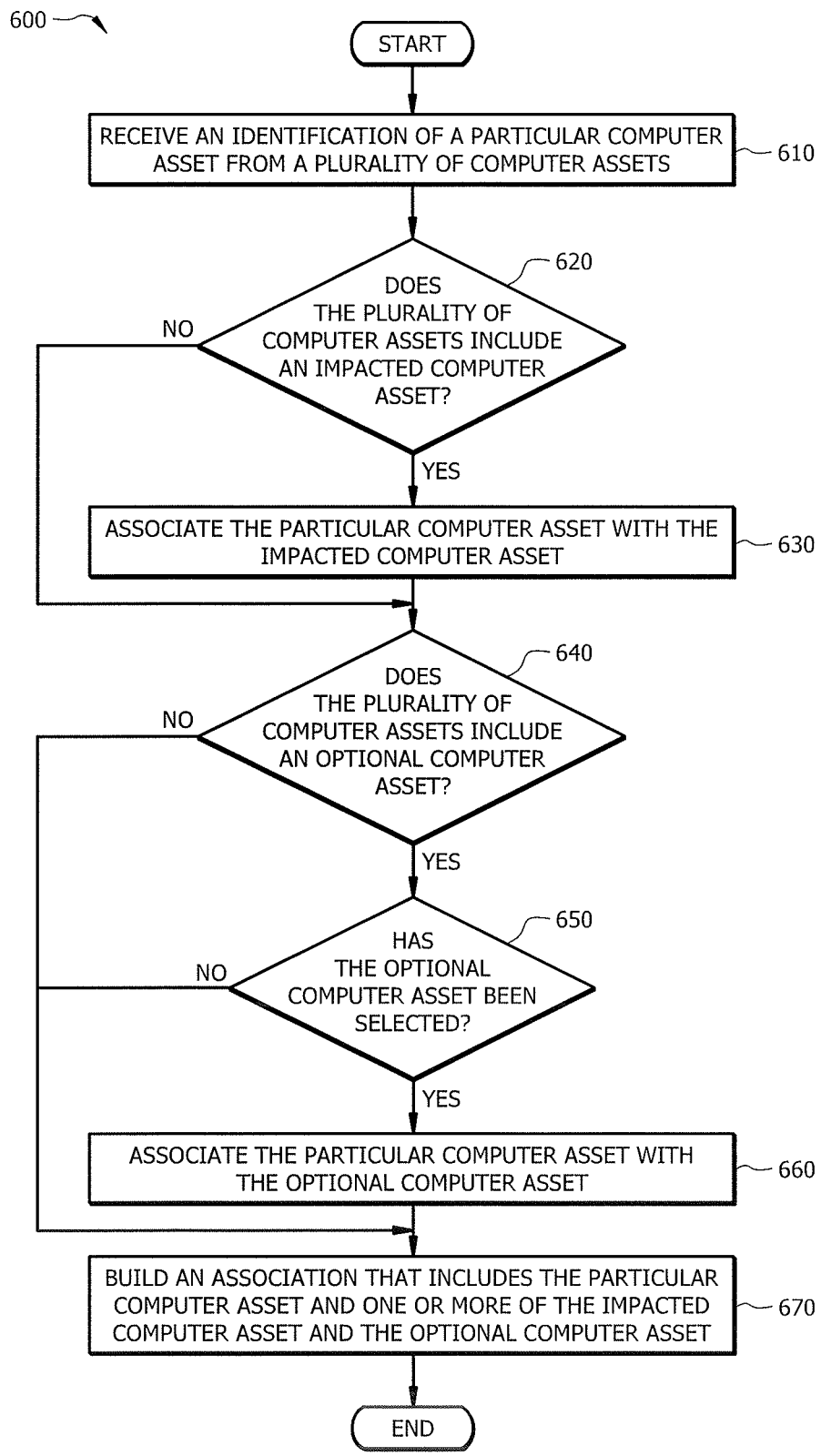
FIG. 6 illustrates an example of a method for identifying and associating computer assets impacted by potential change to a particular computer asset, according to certain embodiments.

FIG. 6 illustrates a method 600 for identifying and associating computer assets impacted by potential change to a particular computer asset 130, according to certain embodiments. The method begins at step 610, where an interface 112 of data analyzer 110 receives an identification of a particular computer asset 130p from a plurality of computer assets 130. For example, processor 116 may receive a name of computer asset 130p from workstation 120. In certain embodiments, data analyzer 110 receives the identification of particular computer asset 130p in the form of a request from user 122 to determine whether any other computer assets 130 would be impacted by a potential change to particular computer asset 130p. In response to receiving the identification of particular computer asset 130p, processor 116 searches one or more databases 140 for characteristics of each computer asset 130 based on particular computer asset 130p.

In certain embodiments, the characteristics of each computer asset 130 include a name of each computer asset 130, a type of operating system, a version of the operating system, a patch level, a patch date, a type of computer asset 130, and a status of service for each computer asset 130. In certain embodiments, the characteristics indicate whether or not each computer asset 130 has been assigned a change request number. In one example, if particular computer asset 130p has not been assigned a change request number, processor 116 may create a change request number for particular computer asset 130p.

At step 620, processor 116 of data analyzer 110 determines, in response to the identification of particular computer asset 130p, whether computer assets 130 include an impacted computer asset. For example, processor 116 may identify computer asset 130q as being an impacted computer asset. This identification of impacted computer asset 130q may include determining, based on the characteristics of particular computer asset 130p and impacted computer asset 130q, that impacted computer asset 130q depends on particular computer asset 130p for operation. For instance, processor 116 may determine that operation of impacted computer asset 130q will shut down if a potential change to particular computer asset 130p is implemented. If processor 116 determines that computer assets 130 include an impacted computer asset, method 600 proceeds to step 630. Otherwise, method 600 proceeds to step 640.

At step 630, processor 116 associates particular computer asset 130p with impacted computer asset 130q. For example, processor 116 may group particular computer asset 130p and impacted computer asset 130q such that particular asset 130p and impacted computer asset 130q share a change request number. In certain embodiments, processor 116 automatically associates particular computer asset 130p with the identified impacted computer assets regardless of whether user 122 has selected the identified impacted computer assets for association. Method 600 then proceeds to step 640.

At step 640, processor 116 of data analyzer 110 determines, in response to the identification of particular computer asset 130p, whether computer assets 130 include an optional computer asset. For example, processor 116 may identify computer asset 130s as being an optional computer asset. This identification of optional computer asset 130s may include determining, based on the characteristics of particular computer asset 130p and optional computer asset 130s, that optional computer asset 130s shares an exact or similar application with particular computer asset 130p. If processor 116 determines that computer assets 130 include an optional computer asset, method 600 proceeds to step 650. Otherwise, method 600 proceeds to step 670.

At step 650, processor 116 of data analyzer 110 determines whether optional computer asset 130s has been selected to be associated with particular computer asset 130p. For example, processor 116 may receive an indication from user 122 to associate optional computer asset 130s with particular computer asset 130p. If processor 116 determines that optional computer asset 130s has been selected for association, method 600 proceeds to step 660. Otherwise, method 600 proceeds to step 670.

At step 660, processor 116 associates particular computer asset 130p with optional computer asset 130s. For example, processor 116 may group particular computer asset 130p and optional computer asset 130s such that particular asset 130p and optional computer asset 130s share a change request number. Method 600 then proceeds to step 670.

The method ends at step 670, where processor 117 builds an association that includes particular computer asset 130p and one or more impacted computer asset(s) 130q and optional computer asset(s) 130s. For example, processor 116 may associate particular computer asset 130p, impacted computer asset 130q, and optional computer asset 130s such that these three computer assets share a change request number.

Modifications, additions, or omissions may be made to method 600 depicted in FIG. 6. Method 600 may include more, fewer, or other steps. For example, processor 116 may determine that computer assets 130 include multiple impacted computer assets and/or multiple optional computer assets. As another example, processor 116 may determine that computer assets 130 do not include any impacted computer assets and/or optional computer assets. Steps may also be performed in parallel or in any suitable order. While discussed as specific components completing the steps of method 600, any suitable component of system 100 may perform any step of method 600.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method, comprising:
   searching, by one or more processors and in response to a request to determine a computer asset from a plurality of computer assets that would be impacted by a potential change to a particular computer asset of the plurality of computer assets, one or more databases for characteristics of each of the plurality of computer assets;
   identifying, by the one or more processors, an impacted computer asset from the plurality of computer assets, wherein:
      the particular computer asset and the impacted computer asset are connected to a network;
      the particular computer asset is a host server;
      the impacted computer asset is a virtual server hosted by the particular computer asset; and
      identifying the impacted computer asset comprises determining, by the one or more processors and based on the characteristics of the impacted computer asset and the particular computer asset, that the impacted computer asset depends on the particular computer asset for the impacted computer asset's connection to the network;
   generating, by the one or more processors, an association from the plurality of computer assets, wherein the association comprises the particular computer asset and the impacted computer asset;
   determining, by the one or more processors, that the particular computer asset has not been assigned a change request; and
   creating, by the one or more processors, a change request for the particular computer asset.

2. The method of claim 1, further comprising identifying, by the one or more processors, an optional computer asset from the plurality of computer assets, wherein identifying the optional computer asset comprises determining, by the one or more processors and based on the characteristics of the optional computer asset and the particular computer asset, that the optional computer asset and the particular computer asset have at least one common application.

3. The method of claim 2, further comprising receiving, by the one or more processors, an indication to associate the optional computer asset with the particular computer asset, wherein the association further comprises the optional computer asset.

4. The method of claim 2, wherein
   the optional computer asset is a server clustered to the particular computer asset.

5. The method of claim 1, further comprising displaying, by an interface, one or more of the following characteristics of the particular computer asset:
   a name of the particular computer asset;
   a change request number assigned to the particular computer asset;
   a type of operating system;
   a version of the operating system;
   a patch level;
   a patch date;
   a type of the particular computer asset; and
   a status of service for the particular computer asset.

6. The method of claim 1, wherein the one or more databases are inventory systems comprising a server inventory system, a database inventory system, and an application inventory system.

7. One or more computer-readable non-transitory storage media embodying software that, when executed by one or more processors, cause the one or more processors to perform operations comprising:
   searching, in response to a request to determine a computer asset from a plurality of computer assets that would be impacted by a potential change to a particular computer asset of the plurality of computer assets, one or more databases for characteristics of each of the plurality of computer assets;
   identifying an impacted computer asset from the plurality of computer assets, wherein:
      the particular computer asset and the impacted computer asset are connected to a network;
      the particular computer asset is a host server;
      the impacted computer asset is a virtual server hosted by the particular computer asset; and
      identifying the impacted computer asset comprises determining, based on the characteristics of the impacted computer asset and the particular computer asset, that the impacted computer asset depends on the particular computer asset for the impacted computer asset's connection to the network;
   generating an association from the plurality of computer assets, wherein the association comprises the particular computer asset and the impacted computer asset;
   determining that the particular computer asset has not been assigned a change request; and
   creating a change request for the particular computer asset.

8. The one or more computer-readable non-transitory storage media of claim 7, wherein the operations further comprise identifying an optional computer asset from the plurality of computer assets, wherein identifying the optional computer asset comprises determining, based on the characteristics of the optional computer asset and the particular computer asset, that the optional computer asset and the particular computer asset have at least one common application.

9. The one or more computer-readable non-transitory storage media of claim 8, wherein the operations further comprise receiving an indication to associate the optional computer asset with the particular computer asset, wherein the association further comprises the optional computer asset.

10. The one or more computer-readable non-transitory storage media of claim 8, wherein
the optional computer asset is a server clustered to the particular computer asset.

11. The one or more computer-readable non-transitory storage media of claim 7, wherein the operations further comprise displaying one or more of the following characteristics of the particular computer asset:
a name of the particular computer asset;
a change request number assigned to the particular computer asset;
a type of operating system;
a version of the operating system;
a patch level;
a patch date;
a type of the particular computer asset; and
a status of service for the particular computer asset.

12. The one or more computer-readable non-transitory storage media of claim 7, wherein the one or more databases are inventory systems comprising a server inventory system, a database inventory system, and an application inventory system.

13. A system comprising one or more processors and a memory coupled to the one or more processors comprising instructions that, when executed by the one or more processors, cause the one or more processors to perform operations comprising:
searching, in response to a request to determine a computer asset from a plurality of computer assets that would be impacted by a potential change to a particular computer asset of the plurality of computer assets, one or more databases for characteristics of each of the plurality of computer assets;
identifying an impacted computer asset from the plurality of computer assets, wherein:
the particular computer asset and the impacted computer asset are connected to a network;
the particular computer asset is a host server;
the impacted computer asset is a virtual server hosted by the particular computer asset; and
identifying the impacted computer asset comprises determining, based on the characteristics of the impacted computer asset and the particular computer asset, that the impacted computer asset depends on the particular computer asset for the impacted computer asset's connection to the network;
generating an association from the plurality of computer assets, wherein the association comprises the particular computer asset and the impacted computer asset;
determining that the particular computer asset has not been assigned a change request; and
creating a change request for the particular computer asset.

14. The system of claim 13, wherein the operations further comprise identifying an optional computer asset from the plurality of computer assets, wherein identifying the optional computer asset comprises determining, by the one or more processors and based on the characteristics of the optional computer asset and the particular computer asset, that the optional computer asset and the particular computer asset have at least one common application.

15. The system of claim 14, wherein the operations further comprise receiving an indication to associate the optional computer asset with the particular computer asset, wherein the association further comprises the optional computer asset.

16. The system of claim 14, wherein
the optional computer asset is a server clustered to the particular computer asset.

* * * * *